Feb. 12, 1924.
J. BLAEKER
1,483,210
CONNECTER FOR CHAIN LINKS
Filed March 6, 1923
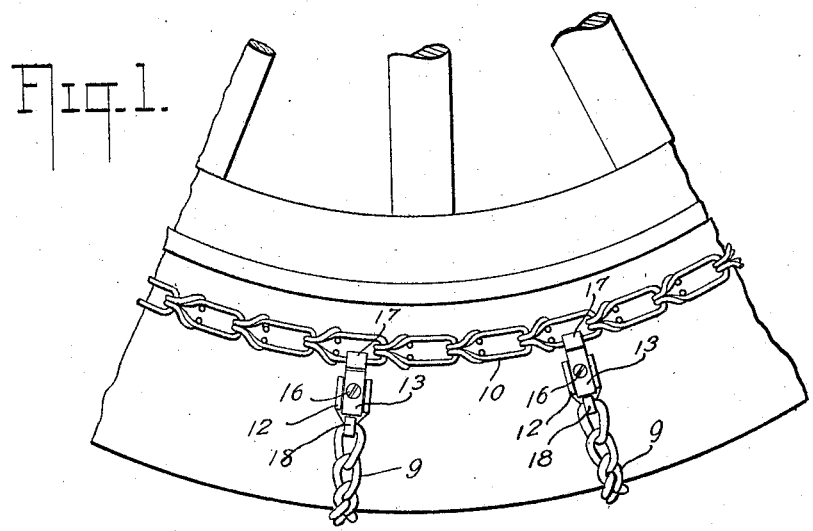
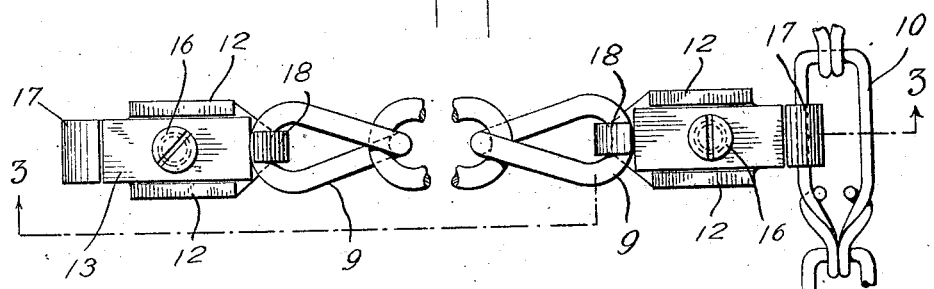
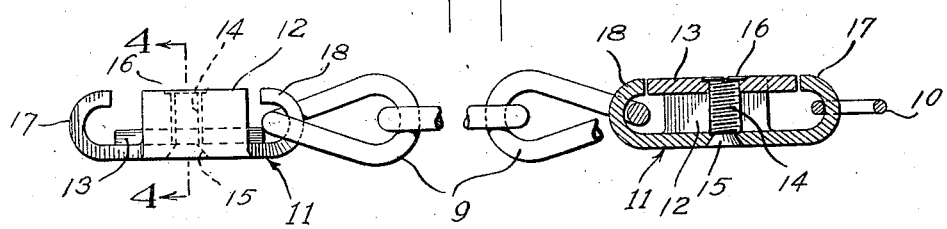
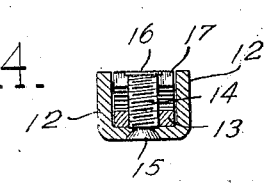
Inventor
JOSEPH BLAEKER
By his Attorney Patented Feb. 12, 1924.

1,483,210

UNITED STATES PATENT OFFICE.

JOSEPH BLAEKER, OF NEW YORK, N. Y., ASSIGNOR OF ONE-HALF TO MAXWELL EISENSTEIN, OF NEW YORK, N. Y.

CONNECTER FOR CHAIN LINKS.

Application filed March 6, 1923. Serial No. 623,239.

*To all whom it may concern:*

Be it known that I, JOSEPH BLAEKER, a citizen of the United States, and a resident of New York city, in the county of the Bronx and State of New York, have invented certain new and useful Improvements in Connecters for Chain Links, of which the following is a full, clear, and exact description.

Among the principal objects which the present invention has in view are: to facilitate the removal and replacement of worn cross chains; to increase the life of service of cross chains; to secure cross chains in service rapidly; to avoid any projections that might accidently engage any object; and to simplify and cheapen the construction.

*Drawings.*

Figure 1 is a side view of a fragment of a vehicle wheel equipped with a pneumatic tire and non-skid chains, the cross links of which are engaged with the side chains using a connecter constructed and arranged in accordance with the present invention.

Figure 2 is a detailed view on enlarged scale showing fragments of a side chain and a cross chain united by means of connecters constructed and arranged in accordance with the present invention.

Figure 3 is an edge view of the same.

Figure 4 is a cross section of one of the connecters, the section being taken as on the line 4—4 in Fig. 3.

*Description.*

The service in which the herein described connecter is generally employed is that of uniting in service the cross chains 9 with the side chains 10 of non-skid chains, constructed and arranged in accordance with the usual practice.

To this end the connecter consists of a body portion 11, constructed from plate metal of approved gage and temper. Extending upward from the body portion and in perpendicular relation thereto are guide plates 12 between which, and in guided relation to which, move a locking plate 13. The locking plate 13 is elevated and depressed by means of a screw 14, one end of which is kerfed to receive a screw driver, while at the other end is a head 15 adapted to seat within a reamed perforation and to form a pivot for the rotation of the screw 14.

The head 16 of the screw 14 is spread to form a stop member, the function of which is to prevent the travel of the plate 13 out of engagement with the screw 14.

At opposite ends of the body portion 11 are upturned hook extensions 17 and 18. The said extensions are designed for engaging the links of the side chains 10 and of the cross chains 9.

When the plate 13 is depressed to the position shown at the left of Figure 3 of the drawings, the said links may be engaged by the said hook extensions. When so-engaged, if the screw 14 is turned clockwise, the plate 13 is elevated to the position shown at the right of the said Figure 3. In the raised position it will be seen that the links of the two chains are firmly held against disengagement from the connecter.

When a driver of an automobile or other vehicle equipped with pneumatic tires and with non-skid chains of the character indicated desires to remove a broken cross chain or to reverse the same, all that is necessary is to turn the screw 14 on any one of the connecters until the plate 13 thereof is depressed to the position shown at the left side of Figure 3 of the drawings. In this position of the plate 13, it is easy to remove the links of the cross chain 9 or of the side chains 10.

If the object is to reverse the chains 9 to increase the length of service thereof, the end links of the said chain are disengaged from the extensions 18, the chain 9 is then reversed to present the unworn side of the links thereof and the end links of the said cross chain are again inserted within the hook extensions 18. The plates 13 now being elevated to close the entrance to the hook extensions 17 and 18, the cross chain is again in service position.

The guide plates 12 serve the double purpose of guiding the plate 13 in its elevation and depression as well as protecting the said plate 13 and the screw 14. It will be noted by reference to the drawings that the structure comprising the body 11, the side plates 12 and the locking plate 13 is box-like, in character and of a form to resist in the best possible way, distortion or damage when struck by or when striking other objects such as the stones of the road or curb-stone of a street. While the arrangement when the plate 13 is in its elevated position, as best seen in Fig. 3 of the drawings, the plates 12 are reinforcing each to the other and are reinforced by the plate 13, while the plate 13 is protected from direct blow and the supporting screw 14 from any torsional strain.

It is obvious that while I have herein described and shown by the accompanying drawings the employment of the connecter in automobile or vehicle service, it will nevertheless, be understood that the connecter may be employed in any suitable relation where it is desired to unite the links of chains.

Claims.

1. A connecter for chain links comprising an elongated body portion having upturned hook extensions at the opposite ends thereof and side guide plates upturned at the sides thereof, and a closure member operatively disposed between said guide plates for closing the entrances to said hook-like extensions; and means for moving the said closure member to and from between the ends of said extensions.

2. A connecter for chain links comprising an elongated body portion having upturned hook extensions at the opposite ends thereof and side guide plates upturned at the sides thereof, and a closure member operatively disposed between said guide plates for closing the entrances to said hook-like extensions; and means for moving the said closure member to and from between the ends of said extensions, said means embodying a screw, the threads whereof engage said closure member.

3. A connecter for chain links comprising an elongated body portion having upturned hook extensions at the opposite ends thereof and side guide plates upturned at the sides thereof, and a closure member operatively disposed between said guide plates for closing the entrances to said hook-like extensions; and means for moving the said closure member to and from between the ends of said extensions, said means embodying a screw, the threads whereof engage said closure member, said screw being rotatably mounted in said body portion.

4. A connecter for chain links comprising an elongated body portion having upturned hook extensions at the opposite ends thereof and side guide plates upturned at the sides thereof, and a closure member operatively disposed between said guide plates for closing the entrances to said hook-like extensions; and means for moving the said closure member to and from between the ends of said extensions, said means embodying a screw, the threads whereof engage said closure member, said screw being rotatably mounted in said body portion and flush with the outer surface thereof.

5. A connecter for chain links comprising an elongated body portion having a box-like median section, the upper side whereof is removable from its service position, and hook-end extensions, the extremities of said extensions being adjacent the ends of said removable side when disposed in closure relation to said hook-end extensions; a threaded stem rotatably carried by said body and having threaded engagement with the upper side thereof whereby the latter may be moved into and out of an operative position with respect to said hook-end extensions upon the rotation of the stem.

JOSEPH BLAEKER.